(12) United States Patent
Kilchichakov

(10) Patent No.: US 8,931,741 B1
(45) Date of Patent: Jan. 13, 2015

(54) GRAVITY ACCELERATION STATION

(71) Applicant: Pavel Kilchichakov, Abakan (RU)

(72) Inventor: Pavel Kilchichakov, Abakan (RU)

( * ) Notice: Subject to any disclaimer, the term of this patent is extended or adjusted under 35 U.S.C. 154(b) by 54 days.

(21) Appl. No.: 13/894,386

(22) Filed: May 14, 2013

Related U.S. Application Data

(60) Provisional application No. 61/651,549, filed on May 25, 2012.

(51) Int. Cl.
  *B64G 1/00* (2006.01)
  *B64G 1/60* (2006.01)
(52) U.S. Cl.
  CPC .................................... *B64G 1/60* (2013.01)
  USPC ................... 244/171.9; 244/173.1; 244/159.4
(58) Field of Classification Search
  USPC ................................. 244/171.9, 173.1, 154.9
  See application file for complete search history.

(56) References Cited

U.S. PATENT DOCUMENTS

| | | | |
|---|---|---|---|
| 1,906,443 A | 5/1933 | Bisch | |
| 3,136,075 A | 6/1964 | Arnzen | |
| 3,196,557 A | 7/1965 | Davidsen | |
| 3,209,468 A | 10/1965 | Frisch | |
| 3,340,619 A | 9/1967 | Berlin | |
| 3,749,332 A * | 7/1973 | Gray | 244/171.7 |
| 4,175,723 A * | 11/1979 | Shea, Jr. | 244/171.9 |
| 4,643,375 A * | 2/1987 | Allen | 244/171.9 |
| 4,710,128 A | 12/1987 | Wachsmuth et al. | |
| 5,051,094 A | 9/1991 | Richter et al. | |
| 5,302,130 A | 4/1994 | Sieving | |
| 5,558,582 A | 9/1996 | Swensen et al. | |
| 5,616,104 A | 4/1997 | Mulenburg et al. | |
| 6,042,382 A | 3/2000 | Halfhill | |
| 6,216,984 B1 * | 4/2001 | Brinsmade | 244/171.9 |
| 6,523,782 B2 * | 2/2003 | Barutt | 244/171.9 |
| 8,038,541 B1 | 10/2011 | Solomon | |
| 2006/0163434 A1 * | 7/2006 | Patel et al. | 244/158.3 |

* cited by examiner

*Primary Examiner* — J. Woodrow Eldred
(74) *Attorney, Agent, or Firm* — Rositza Mladenova

(57) ABSTRACT

A gravity acceleration station for producing gravity acceleration and creating conditions for living under a permanent effect of gravity acceleration more than 1 g for prolonged periods of time. The station comprises a base and a hollow torus, rotating around a central vertical axis. A support of the station and motors for rotation of the station are located peripherally, along with the perimeter of the torus. That feature allows variable size of the station with diameter more than 100 meters, larger area for location of objects, and gradual increase of gravity acceleration from the center of the station along the radius. Due to a mechanism for altering the angle of deviation of the premises of the station, the value of the net acceleration can be changed according to the needs while keeping direction perpendicular to the floor of the premises. The station can be located on the ground or underground.

14 Claims, 9 Drawing Sheets

Fig. 7A
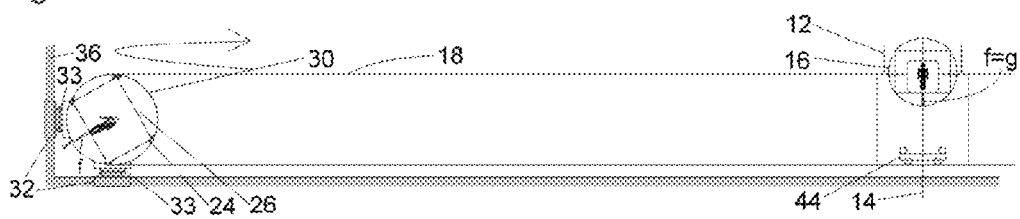
Fig. 7B
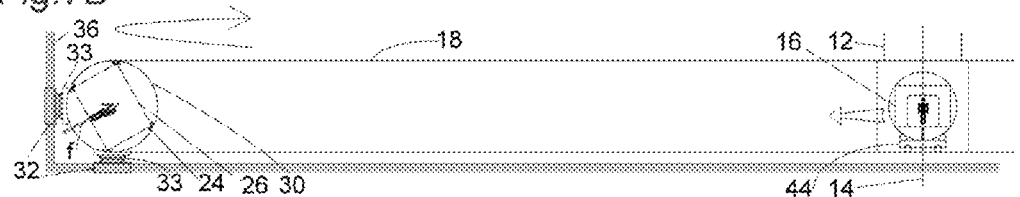
Fig. 7C
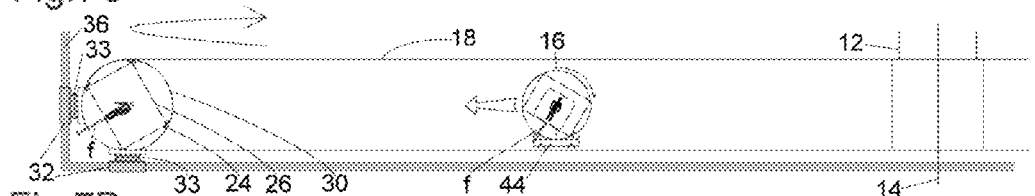
Fig. 7D
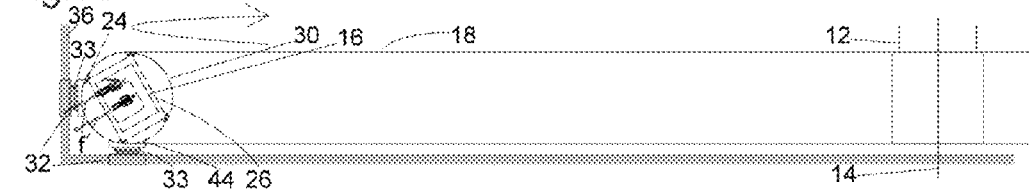
Fig. 7

GRAVITY ACCELERATION STATION

CROSS-REFERENCE TO RELATED APPLICATIONS

This application claims the benefit of provisional patent application Ser. No. 61/651,549, filed 2012 May 25 by the present inventor.

STATEMENT REGARDING FEDERALLY SPONSORED REASEARCH OR DEVELOPMENT

Not applicable

REFERENCE TO SEQUENCE LISTING, A TABLE OR A COMPUTER PROGRAM LISTING COMPACT DISK APPENDIX

Not applicable

BACKGROUND OF THE INVENTION

It is known that a principle of addition of two forces, gravity and centripetal force, produce a permanent acceleration simulating the effect of high gravity more than 1 g and the principle has found application in many engineering solutions, such as turning the railways, race tracks and slides. Also, it can be demonstrated by an example of children's chain carousel on FIG. 1, where a child experiences an effect of two forces, the force of gravity g, and the centrifugal force of $a_n$. The resultant force f deviates from the vertical g and creates a short-term acceleration, acting on the extension of the carousel course of work.

We know that the effect of weightlessness on the International Space Stations (ISS) is formed by the addition of two forces: the force of gravity 1 g, (approximately 9.81 m/s² directed toward the center of the earth), and the centripetal acceleration equal to the force of gravity but with an opposite direction—9.81 m/s². The addition of these two force vectors approximately is equal to 0 m/s², and that is, in other words, the state of weightlessness.

In the past the station was to rotate on its central axis to produce artificial gravity. The majority of early space station concepts created artificial gravity one way or another in order to simulate more natural or familiar environment for the health of astronauts, for example a centrifuge for training purposes of pilots and astronauts. These devices can create acceleration more than 1 g, but for a short time.

Nowadays, on the International Space Stations (ISS) many scientific experiments are conducted in conditions of weightlessness (no gravity), investigating the effect of weightlessness on plants, different materials and people.

The problems with experiments conducted in conditions of weightlessness or high gravity force are that:

Long-term exposure to micro-gravity could generate long-term health problems for astronauts who do not utilize their muscles. Their bones lose calcium for the same reason. Although there are exercise equipment on space shuttles and on the International Space Stations after returning from micro-gravity environment astronauts find their muscles weak.

The fact that humans have to withstand gravity acceleration creates problems. According to that, the pilots and astronauts are trained from time to time in centrifuges to increase the resistance to gravity acceleration. But they are tested for a short time, not enough to run the mechanisms of adaptation of the human body.

Accordingly several advantages of one or more aspects are as follows:

My station simulates artificial gravity more than 1 g and creates environment for people to live and work under gravity more than 1 g for prolonged periods of time. In this way complex adaptation mechanisms of human body can run and physical strength can increase.

My station can be used for scientific research purposes, for example for studding the effect of permanent gravity acceleration more than 1 g on living organisms—people, plants, animals, insects, and protozoa. Any scientific organization will be possible to conduct new research in a great number of areas: physiology, genetics, biology, engineering, alloys, and many others and to produce results on modifications of the plants and animals in a high gravity environment.

Medical organizations will be able to work on improvement of strength of the cardiovascular system, bones and other human systems. An environment of 1.1-1.5 g acceleration can provide restorative effect on the human body.

Different businesses can use environment with gravity acceleration more than 1 g to increase physical capacity for their employees.

My station may be of interest to NASA. It can be located on the ground or underground. At the same time the station can simulate conditions of life on planets with high gravity more than 1 g and can be used to train and prepare astronauts, military and athletes. For example, an athlete who lives and does exercise for several months under the effect of gravity more than 1 g can show significantly better results than an athlete trained in earth conditions. After all, gravity will affect the athletes even at night when they sleep. As an addition, it will not be dope but training conditions. Pilots, astronauts or soldiers trained under the effect of gravity more than 1 g will have greater physical strength and they will be able to withstand high gravity acceleration during flight operations.

My station for artificial gravity environment allows the tester to be under the effect of permanent acceleration more than 1 g indefinitely long time—days, weeks, months and longer.

The station support and the motors for driving the revolution of the torus of the station are located peripherally, along a perimeter of the torus. That feature allows variable size of the station with diameter more than 100 meters, location of objects in a large area, and gradual increase of gravity acceleration from the center of the station along the radius. This is a reason for using the station for many different tasks. On the contrary, gravitational facility in U.S. Pat. No. 3,209,468 has a central support and drive, so the size of device is limited to 20-50 m in diameter, which results in limited magnitude of gravity acceleration. These limitations create a problem for using the patent for training of athletes, military, etc.

In my station the value of the net acceleration can be changed according to the needs because the construction of the station provides a mechanism for altering the angle of deviation of premises of the station according to the changes of the gravity acceleration. The patent U.S. Pat. No. 3,209,468 facility has a fixed angle of deviation. As a result one unit of the device is suitable only for a particular value of gravity acceleration. If a different value of gravity acceleration is necessary, the new unit of the device must be built up.

In U.S. Pat. No. 3,209,468 an access chair can deliver men and animals. The access chair has a fixed angle of deviation and limited capacity for delivery of men and animals. In my station a lift cabin delivers cargo and personnel and the angle of deviation of the elevator cabin is adjustable by a computer in accordance with the distance from the central axis. This characteristic greatly expands the range of application of my station.

The U.S. Pat. No. 3,209,468 does not provide compensation of Coriolis Effect. There is only a limitation of the Coriolis Effect value by specific limitations in the size of the facility. In my station, particular floor structure brings to the compensation of Coriolis Effect. As a result my station can be of different size, providing gradual distribution (change) of gravity acceleration from the axis along to the radius and having direction perpendicular to the floor.

The environment of my station allows using adaptive ability of the human body completely. After all, gravity more than 1 g has an effect on the tester at all times, including during the sleep or during the rest. As a result of prolonged exposure of high g acceleration, the skeletal structure, the cardiovascular system, muscles and ligaments can be strengthened and endurance of muscles can increase.

In the U.S. Pat. No. 3,209,468 there can be only one torus in the facility. On the contrary, my station may have multiple tori, as well as multiple floors of tori so that the operational area of the station may increase. In addition, with the same speed of rotation of the station, the gravity acceleration will be different, subject to the radius of each torus. This structure provides opportunity of changing the level of acceleration, higher or lower, by moving from torus to torus with different radii while the angular velocity of rotation of the station is constant. As a result, within one station different levels of acceleration can be explored at the same angular velocity of rotation of the station.

BRIEF SUMMERY OF THE INVENTION

In accordance with one embodiment, a gravity acceleration station for creating an environment of gravity acceleration more than 1 g comprises a base and a hollow torus, rotating around a central vertical axis. The station has a peripheral support, along with the perimeter of the torus. Rooms of sufficient size for different purposes not limited only to living, working, training and performing scientific research are located in a closed compartment of the torus. Each room has fastening and rotating mechanism for adjustment of the room position according to the speed of rotation so that the resultant gravity acceleration has direction perpendicular to the floor of the rooms. Lift cabins, movable on a trolley within lift corridors, deliver cargo and personnel from an entrance located on the base of the station and adjacent to the central axis of the station. The station is located on the ground or underground. A computer regulates an angle of deviation of the rooms and the lift cabins according to the speed of rotation of the station and desired gravity acceleration. Motors for driving the revolution of the torus are alternatively mounted on the torus walls or located on the base, along the torus perimeter.

In using gravity acceleration station, individuals who will experience an effect of gravity acceleration more than 1 g enter the station through an entrance adjacent to a central axis and arrive in a lift cabin. The lift cabin proceeds to one of the rooms by moving on a trolley within one of radially disposed lift corridors extended between a vertical axis and a torus. The lift cabin has an angle of deviation according to the distance between central axis and the lift cabin so as to be able to keep desired magnitude of the gravity acceleration while rotating the gravity acceleration station at a constant speed. The individuals enter the rooms. Each room has an angle of deviation according to the distance between the room and the central axis, so as to be able to keep desired magnitude of gravity acceleration, being perpendicular to the floor of the rooms, while rotating the gravity acceleration station at a constant speed. The individuals use the rooms for different purposes not limited to living, working, training, and researching and for recreational activities for prolonged periods of time. The station provides premises for replacement of worn motors by new ones without preventing the rotation of the station.

A gravity acceleration station may be constructed, assembled and operated using more than one torus. The station can provide an opportunity of exploring different level of gravity acceleration, for prolonged periods of time in environments inhabitable by living occupants wishing to transfer from an environment of weaker gravity to an environment of stronger gravity or from an environment of stronger gravity to an environment of weaker gravity by moving from one of the torus to another having different radius, while the angular velocity of rotation of the station has a constant value.

DRAWINGS—REFERENCE NUMERALS

12—entrance
14—vertical axis
16—lift cabin
18—lift corridors
20—circle of torus
22—tambour connecting rooms
24—fastening and rotating mechanism
26—rooms for living and working
28—axis for rotation of the rooms (along with torus circle)
30—torus
32—motor for rotation of the station
33—support of the station
34—premises for motor repairing
36—base of the station
44—trolley for drive and rotation of the lift cabin
52—floor boards

BRIEF DESCRIPTION OF THE SEVERAL VIEWS OF THE DRAWING

I have included twelve drawings:

FIG. 7 contains FIG. 7A, FIG. 7B, FIG. 7C, and FIG. 7D. They are schematic views of cargo delivery to the rooms of the station.

FIG. 9 is a top view of a room of the station. It illustrates different parts of the room located at different distance from the axis of rotation of the station.

FIG. 10 shows deflection of moving points staying at a different distance from the axis of rotation.

DETAILED DESCRIPTION OF THE INVENTION

Figure 3:
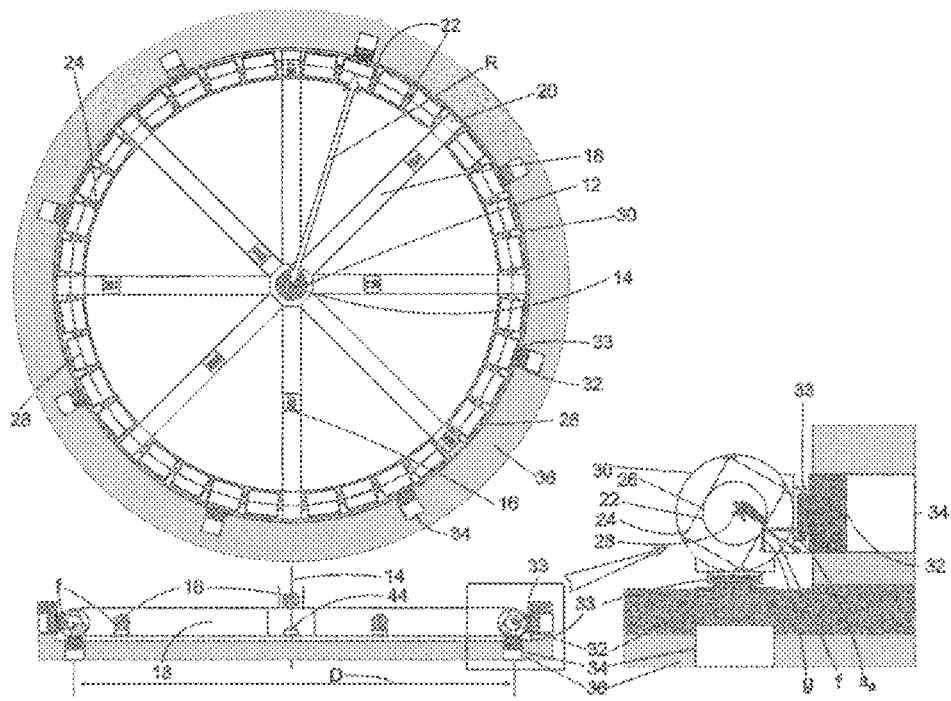
FIG. 3A is a top view of the station.
FIG. 3B is a side view of the station.

One embodiment of the gravity acceleration station is illustrated in FIG. 3. The gravity acceleration station with a torus 30 rotates around a vertical axis of rotation 14. Entrance 12 is in the central part of the station and matches with the location of the axes 14 on the base of the station 36. The central part of the station is connected with the torus by lift corridors 18, resembling radially disposed spokes. Through the corridors 18, lift cabins 16 deliver cargo and personnel to rooms 26 located within the torus 30. Rooms 26 are attached to each other by tambours 22. Each of the rooms 26 can rotate around an axis 28 that corresponds to a circle 20 with radius R of torus 30. The revolving of each room is accomplished by fastening and rotation mechanism 24 that controls the position of each room 26 within the torus 30.

Figure 8:
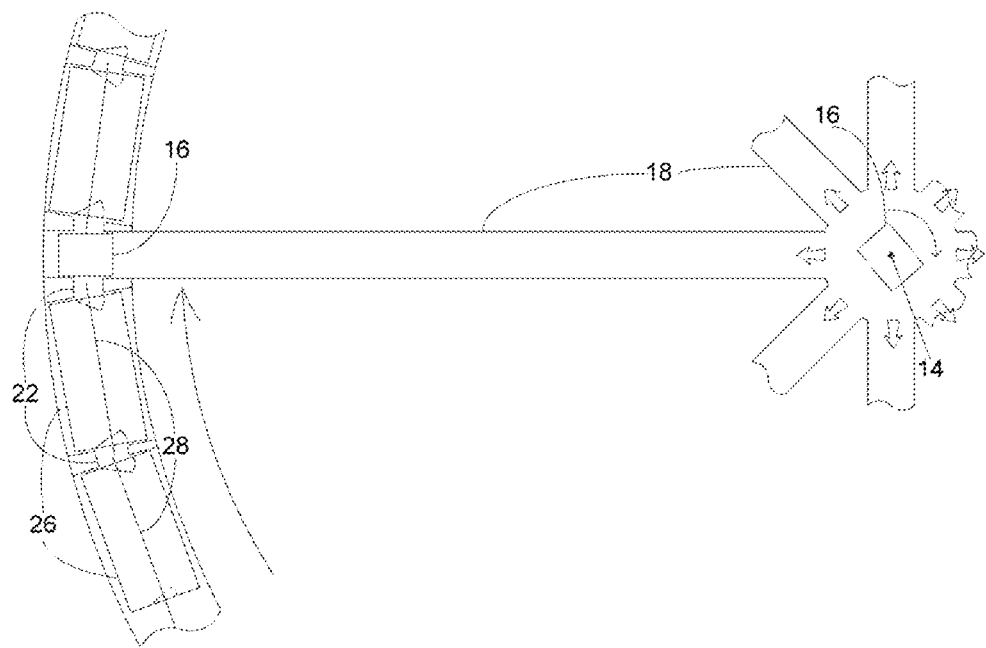
FIG. 8 is a top view of a fragment of the station. It illustrates how the elevator cab travels through an elevator corridor towards the rooms of the station.

FIG. 7 illustrates the process of providing personnel and material supplies for the station. Lift cabin 16, delivers cargo or personnel by lowering into the main entrance 12. After loading the cargo or personnel, lift cabin 16 starts rotating around vertical axis 14 by a trolley 44 to synchronize its rotation with the rotation of the station, and then the lift cabin 16 moves forward into lift corridor 18 toward rooms 26 within torus 30 as shown in FIG. 8.

Rooms 26 of the station can be of sufficient size for use in various capacities: living rooms, laboratories, warehouses, rooms for exercise, recreation and other premises that can bring to comfortable life of the people inside.

Motors 32 for rotation of the station can be located in any convenient place, for example on the base of the station or on the walls of the station. FIG. 3 shows motors 32, fixed on the base 36 of the station. Due to a permanent rotation of the station, extra motors are necessary to replace worn out motors. The worn out motors can be repaired in premises 34 while other motors continue to work.

Structurally, the station can have different types of support not limited to rails, wheels, and electromagnetic cushion.

To reduce air resistance and power consumption, the station can be placed underground and the air of a cavity where the station rotates can be pumped out.

To reduce vibration and frictions it is necessary to ensure that a center of gravity matches with axis of rotation 14 of the station. This can be accomplished by a ballast hydraulic system.

Operation

Figure 1:
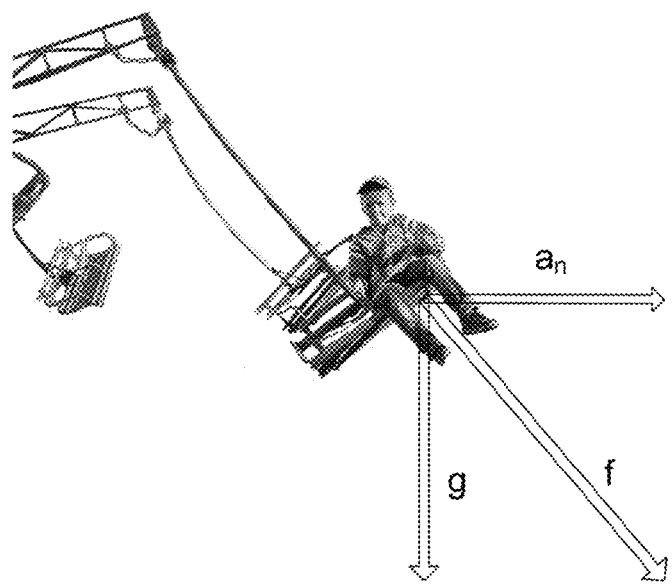
FIG. 1 is an example of children's chain carousel, where each child experiences an effect of two forces, the force of gravity g, and the centrifugal force $a_n$. The resultant force f deviates from the vertical and creates a short-term acceleration, acting on the extension of the carousel course of work.
Figure 2:
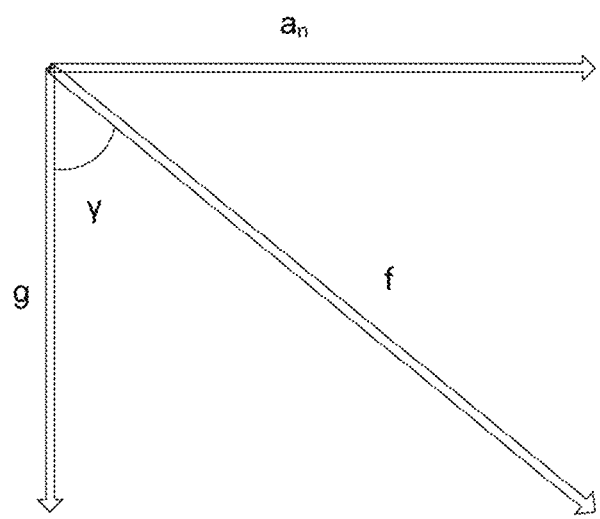
FIG. 2 is a drawing of four parameters:
Force of gravity with acceleration g, centrifugal force with acceleration $a_n$ summation vector of these two forces forms the acceleration f and angle of deviation γ from vertical g.

FIG. 3 shows an embodiment of a station with diameter of torus D=200 m (radius R=100 m), rotating at a constant speed. For example, when the speed of rotation is 4 revolutions per minute, two major forces will act on each body within the torus, the force of gravity with acceleration g=9.81 m/s$^2$, and the centrifugal force with acceleration $a_n$=17, 36 m/s$^2$. The summation vector of those two forces forms the net acceleration f=19.94 m/s$^2$ or about 2, 03 g. The angle of deviation from vertical g is γ=60.56°. The calculations of the parameters shown in FIG. 2 are described below:

For a torus with radius R=100 m circumference C can be calculated by the formula $$C = 2\pi R$$

The result is: C=2×3.1415×100=628.3 m

When the linear velocity is v=41.67 m/s (150 km/h) and the radius is R=100 m, the angular velocity ω is equal to 0.4166 rad/s.

The calculations of the centripetal acceleration $a_n$ can be completed by the formula:

$$a_n = \frac{v^2}{R}$$

where v is the linear velocity, and R—the radius of curvature of the trajectory at this point.

Since v=ωR, when substitute for v the result will be $$a_n = \omega^2 R,$$

where ω is (instantaneous) angular velocity of the movement relative to the center of curvature of the trajectory and R is the radius of curvature of the trajectory at this point.

When substitute with values for V and R, the centripetal acceleration is equal to:

$$a_n = 41.67^2/100 = 17.36 \text{ m/s}^2$$

Addition of vectors positioned at right angles can be determined by the Pythagorean Theorem:

$$f = \sqrt{(a_n^2 + g^2)}$$

When substitute values for $a_n$ and g the result is:

$$f = \sqrt{(17.36^2 + 9.81^2)} = \sqrt{(301.37 + 96.24)} = 19, 94 \text{ m/s}^2, \text{ or in other words, } 19, 94/9, 81 = 2,03 \text{ g } (1 \text{ g}=9.81 \text{ m/s}^2)$$

γ—the angle of deviation from the vertical g. This angle can be determined by the theorem of sinus:

$$\gamma = \arcsin(a_n/f) = \arcsin(17.36/19.94) = \arcsin(0.87) = 1.056 \text{ radians, or about } 60.56°$$

Each of rooms 26 can rotate around an axis 28 that corresponds to the circle 20 with radius R of torus 30. The rotation is possible by fastening and rotating mechanism 24 that controls the position of each of rooms 26 within the torus 30.

Calculations of the angle of rotation γ of each of rooms 26 and consistency of rotation are controlled by a computer. Due to that features, each of rooms 26 in the embodiment of FIG. 3, where the number of rooms is 32, can turn at the angle γ, (in this embodiment at 60.56° shown in the calculations above) so that the summation vector f is perpendicular to the floor of each of rooms 26.

FIG. 3B shows the summation vector f with an arrow. As a result of calculations above, in each of rooms 26, the acceleration will be equal to 2.03 g. Thus, for a living object located in each of rooms 26, a state of high gravity of about 2 g will be simulated.

Figure 4:
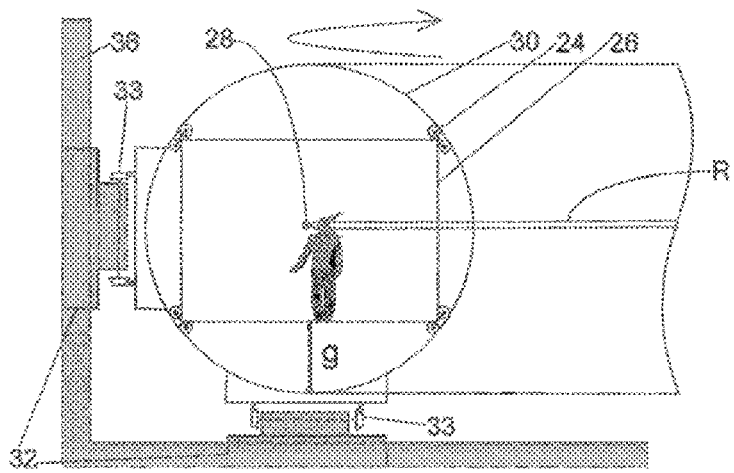
FIG. 4, FIG. 5 and FIG. 6 show positions of the rooms depending on the parameters of rotation of the station and resulting net acceleration respectively around 1 g, 2 g and 3 g.

FIG. 4 illustrates a station of a static position, there is no centripetal force and each of rooms 26 is not deflected so that the body is only under the effect of force of gravity.

Figure 5:
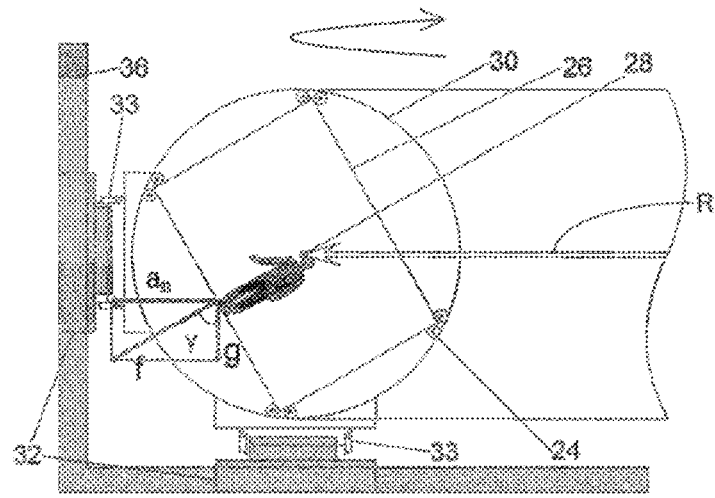

FIG. 5 illustrates a station in rotation motion with a radius R=100 m and the linear velocity of rotation is 150 km/h. Calculations of the parameters are below:

Linear velocity v=41.67 m/s

Centripetal acceleration $a_n$=41.67²/100=17.36 m/s²

Net acceleration $vf=\sqrt{(17.36^2+9.81^2)}$=19.94 m/s², or in other words, 19.94/9.81=2.03 g The angle of deviation γ from the vertical g can be determined by the law of sinus:

γ=arcsin($a_n$/c)=arcsin(17.36/19.94)= arcsin(0.87)=1.056 radians, or about 60.56°

Figure 6:
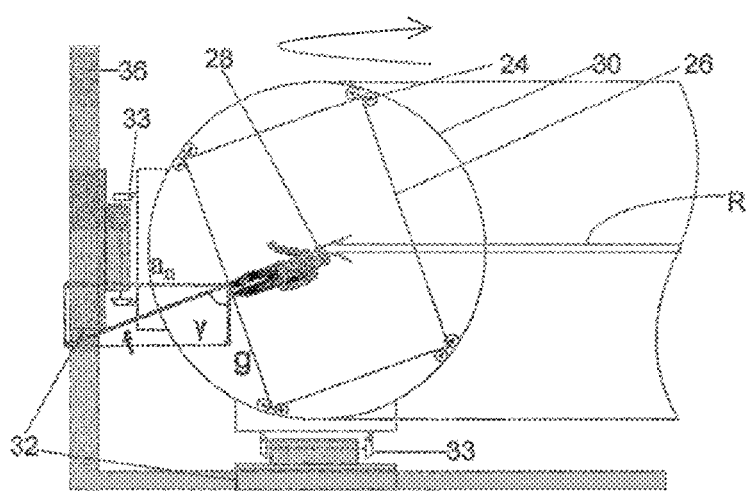

FIG. 6 illustrates a station in rotation motion with a radius R=100 m and a linear velocity of rotation v=190 km/h. The calculations of parameters are below:

Linear velocity v=52.78 m/c²

Centripetal acceleration $a_n$=52.78²/100=27.85 m/s²

Net acceleration $f=\sqrt{(27.85^2+9.81^2)}$=29.53 m/s², or 29.53/9.81=3.01 g

The angle of deviation γ from the vertical g can be determined by the law of sinus:

γ=arcsin($a_n$/c)=arcsin(27.85/29.53)= arcsin(0.943)=1.056 radians, or about 70.62°

FIG. 7 illustrates the process of delivery of personnel and material supplies for the station. Lift cabin 16 accept cargo or personnel at the main entrance 12 located in the central part of the base of the station 36. By a trolley 44, lift cabin 16 starts rotating motion around vertical axis 14 to synchronize its rotation with rotation of the station, then the lift cabin 16 moves forward into the elevator corridor 18 toward rooms 26 within torus 30 as shown in FIG. 8.

FIG. 7 shows schematically how the lift cabin 16 delivers cargo to the station by the entrance 12 to the level of the rooms 26. Due to the fact that with each meter of advancement of the lift cabin 16 in the direction of rooms 26, the centripetal acceleration $a_n$ increases, the computer of the station can adjust the deviation of lift cabin 16 from the vertical in accordance with the above indicated calculations. In fact, people in the lift cabin 16 will not feel the deviation. It would seem to them that the force of gravity increases. Thus, replacement of staff and everything necessary for regular life can be delivered without preventing the rotation of the station.

In using a gravity acceleration station, individuals who will experience an effect of gravity acceleration more than 1 g enter the station through the entrance 12 adjacent to the central vertical axis 14 and arrive in the lift cabin 16. The lift cabin 16 proceeds to one of the rooms 26 by moving on a trolley 44 within one of radially disposed lift corridors 18 extended between a vertical axis 14 and the torus 30. The lift cabin 16 has an angle of deviation according to the distance between central vertical axis 14 and the lift cabin 16 so as to be able to keep desired magnitude of the gravity acceleration while rotating the gravity acceleration station at a constant speed. The individuals enter one of the rooms 26. Each room has an angle of deviation from the vertical vector of the force of gravity g, depending on the distance between room 16 and the central vertical axis 14, so as to be able to keep desired magnitude of gravity acceleration and the gravity acceleration being perpendicular to the floor of each of rooms 26, while the gravity acceleration station rotates at a constant speed. As a result individuals experience a net acceleration as a summation vector of a force of gravity g and a centripetal force $a_n$, so that the net gravity acceleration f being perpendicular to the floor of each of the rooms 26. The individuals use the rooms 26 for different purposes and not limited to living, working, training, and researching and for recreational activities for prolonged periods of time. The station provides premises 34 for replacement and repairing of motors 32 without preventing the rotation of the station.

Figure 9:
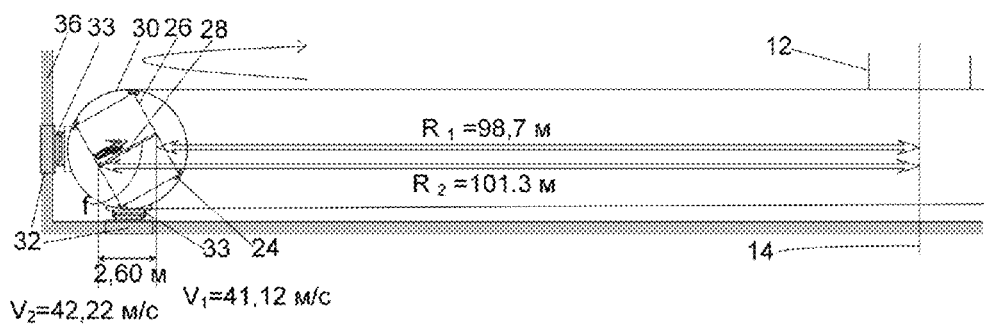
FIG. 9 and FIG. 10 show the mechanism of formation of Coriolis force.
Figure 10:
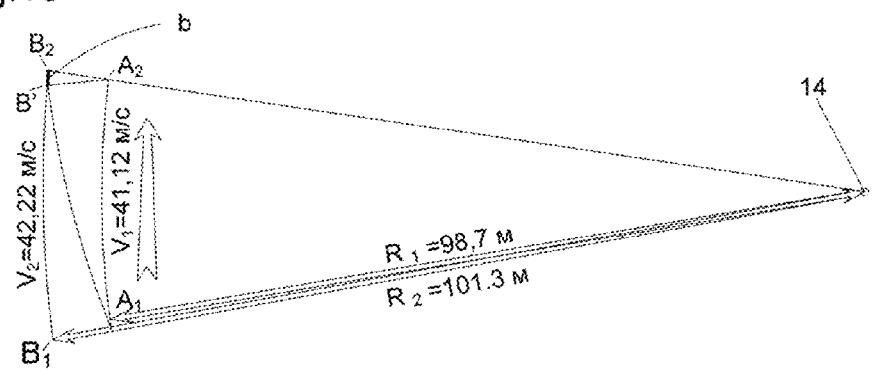
Figure 11:
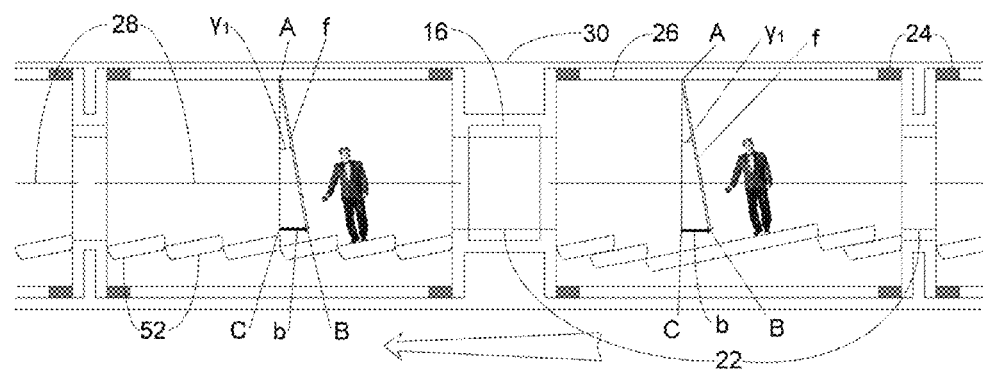
FIG. 11 is a side view of the rooms. It illustrates compensation of Coriolis Effect in the rooms of the station.

The Coriolis Effect on objects inside the station:

In physics, the Coriolis Effect is a deflection of moving objects when they are viewed in a rotating reference frame. In any non-inertia rotation system the bodies experience the Coriolis Effect. FIG. 9, FIG. 10 and FIG. 11 show the mechanism of formation of Coriolis forces, their impact on the facilities and a possible option for compensation of the arising Coriolis forces.

FIG. 9 in the top of the sketch shows that while the room 26 is tilted, the different parts of the room are located at different distance from the axis of rotation 14 of the station. It means that the points at different distance from the rotation axis have different linear velocity.

If the radius of torus 30 of the station is 100 meters, the circumference is C=628.3 m and the station rotates at speed of 150 km/h or 41.67 m/sec.

To determine the difference between the radii of the ceiling and the floor of the room it is necessary to multiply the height of the rooms 3 m, by the sinus of the angle of deviation γ from the vertical g, γ=60.56° The result is a 2.60 meter. Accordingly, the radius of rotation of a point on the ceiling $R_1$ is 98.7 m and the radius of rotation of a point on the floor $R_2$ is 101.3 meters.

For the floor:

$R_2$=101.3, circumference $C_2$=2×π×R=636.53 m, it follows that the linear velocity of a point on the floor is:

$v_2$=41.67×636.53/628.3=42.22m/s

For the ceiling:

$R_1$=98.7, circumference $C_1$=2×π×R=620.07 m, it follows that the linear velocity of a point on the ceiling is:

$v_1$=41.67×620.07/628.3=41.12 m/s

FIG. 10 shows that the position of point $A_1$ on the ceiling will move into position $A_2$, with linear velocity $v_1$=41.12 m/sec for time t. For the same time t, the position of point $B_1$, located on the floor below the point on the ceiling, will move into position $B_2$ with linear velocity $v_2$=42.22 m/s.

If we let the body to fall free from the position of $A_1$, it will move toward the floor with acceleration f approximately equal to 19.94 m/s² according to the above calculations, and linear velocity $v_1$=41.12 m/s according to the Newton's First Law. As a result, the body, for the time of t will move to position B' and falls behind from the point on the floor, which during this time will be in the position of $B_2$. The figure shows that the displacement b is equal to the distance between points B' and $B_2$.

To determine the displacement, first it is necessary to determine time t=$\sqrt{(2\times h/g)}\sqrt{(2\times 3/19.94)}$=0.55 s (g=19.94 m/s²).

Displacement $b=(v_2-v_1)\times t$=(42.22−41.12)×0, 55=0.605 m

FIG. 11 shows the effect of displacement formed in the non-inertia system. This displacement can be compensated by transverse, 60 cm wide boards 52 of the floor of each of rooms 26 with a slope of each board 11.63°. The slope is calculated by the formula $γ_1$=arcsin (CB/AB)=arcsin (0.605/3.00)=arcsin (0.202)=0.203 radians, or 11.63° The result is a small step with height of 11.76 cm. By increasing the width of the boards the slope of the stairs increases.

Alternative Embodiments

Diameter D of torus and velocity of rotation may vary depending on the desired size of living space and desired parameters of artificial gravity acceleration.

Figure 12:
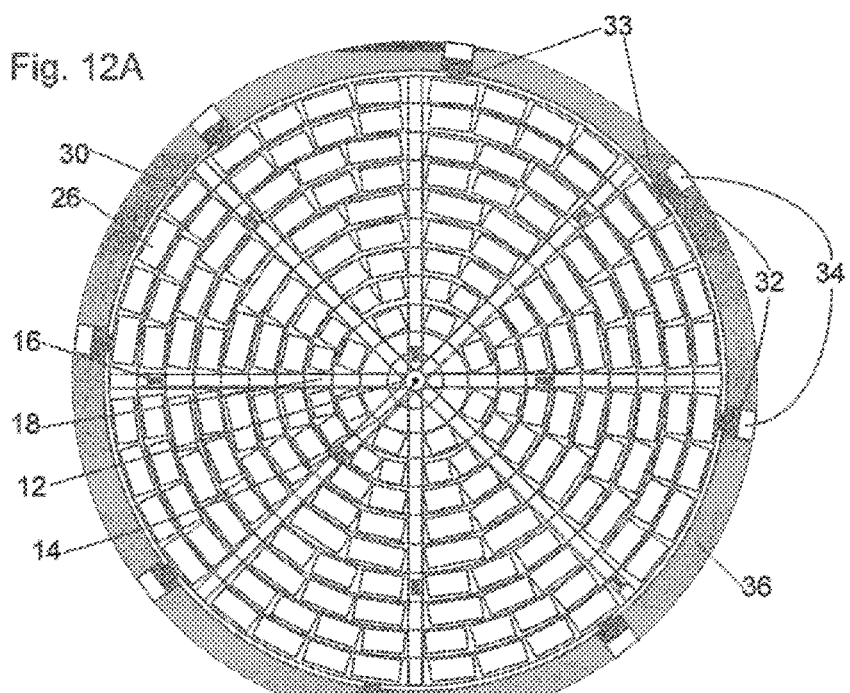
FIG. 12A is a top view of an embodiment of the gravity acceleration station comprising 9 tori with different radii of rotation.
FIG. 12B is a side view of the same station.
Figure 12:
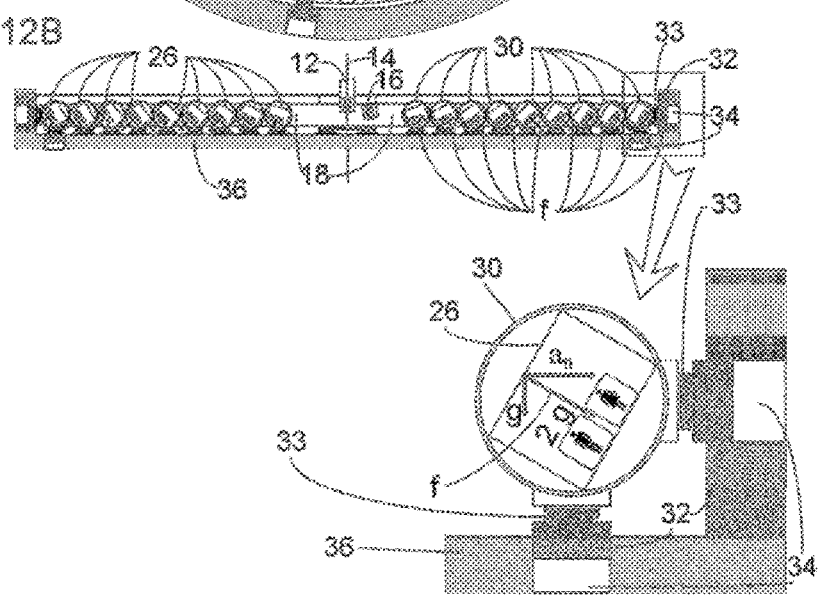

Alternatively a single gravity acceleration station can accommodate more than one torus with different radii. FIG. 12 illustrates a station, comprising nine tori with different radii of rotation: R-20 m, R-30 m, R-40 m, R-50 m, R-60 m, R-70 m, R-80 m, R-90 m, R-100 m. The linear velocity at the different radii will change as follows: the greater the radius, the greater the linear velocity of each of the torus. Angular velocity is the same for any radius.

I use the calculations above for the single torus 30 with radius of 100 m, the linear velocity of 150 km/h, where the acceleration is 2.03 g and apply them for the outer torus of the nine tori station. The parameters of internal tori can be calculated according to the table below:

| 1 Radius of torus R in meters | 2 Circumference C of torus in meters | 3 Angular velocity ω rad/s | 4 Linear velocity v in km/h | 5 Linear velocity v in m/s | 6 Centripetal acceleration $a_n$ in m/s² | 7 Net acceleration f in m/s² | 8 Angle of deviation γ of the net acceleration f from the vertical g in degrees ° | 9 Net acceleration f in g (g = 9.81 m/s²) |
|---|---|---|---|---|---|---|---|---|
| 20 | 125.66 | 0.4166 | 30 | 8.33 | 3.47 | 10.41 | 19.51 | 1.06 |
| 30 | 188.49 | 0.4166 | 45 | 12.50 | 5.21 | 11.11 | 27.99 | 1.13 |
| 40 | 251.32 | 0.4166 | 60 | 16.67 | 6.94 | 12.02 | 35.32 | 1.22 |
| 50 | 314.15 | 0.4166 | 75 | 20.83 | 8.68 | 13.10 | 41.53 | 1.33 |
| 60 | 376.98 | 0.4166 | 90 | 25.00 | 10.42 | 14.31 | 46.75 | 1.46 |
| 70 | 439.81 | 0.4166 | 105 | 29.17 | 12.15 | 15.62 | 51.12 | 1.59 |
| 80 | 502.64 | 0.4166 | 120 | 33.33 | 13.89 | 17.00 | 54.79 | 1.73 |
| 90 | 565.47 | 0.4166 | 135 | 37.50 | 15.63 | 18.45 | 57.90 | 1.88 |
| 100 | 628.30 | 0.4166 | 150 | 41.67 | 17.36 | 19.94 | 60.56 | 2.03 |

Calculations of parameters:
Column 1
Radius of different tori-R
Column 2
Circumference defined by the formula: $C=2\pi R$
Column 3
The angular velocity for all levels is the same.
Column 4
The linear velocity was determined by the ratio: $v_{100} \times C_{90}/C_{100}$:
Example: $v_{90}=150 \times 565.47/628.3=135$ km/h
Column 5
Conversion of the linear velocity from km/h in m/s.
Example: $v_{90}=135 \times 1000/3600=37.50$ m/s
Column 6
Calculation of the centripetal acceleration using the formula:

$$\alpha_n = \frac{v^2}{R}$$

Where v is the linear velocity, and R—the radius of curvature of the trajectory at this point, or $a_n = \omega^2 R$,
where $a_n$ is the centripetal acceleration, v is the (instantaneous) linear velocity along a trajectory,
ω is the (instantaneous angular velocity of movement relative to the center of curvature of the trajectory,
R—radius of curvature of the trajectory at this point. There is a link between the first and second equation since $v=\omega R$.
Example of calculations for $a_n$, when the radius of torus is 90 m:

$$a_n = v^2/R = 37.5^2/90 = 15.63 \text{ m/s}^2$$

Column 7

To calculate the net acceleration f in the torus it is necessary to consider the impact of two major forces of acceleration the acceleration due to gravity 9.81 m/s², and the centripetal acceleration $a_n$. The addition of the vectors of acceleration positioned at right angle can be determined by the Pythagorean theorem: $f=\sqrt{(a_n^2+g^2)}$.

Example of calculations: $f_{80}=\sqrt{(13.89^2+9.81^2)}=17.00$ m/s².

The effect of net acceleration f will vary as the magnitude of the centripetal acceleration $a_n$ changes depending on the radius of the torus.

Column 8

γ—angle of deviation of the net acceleration f from the vertical g can be determined for each torus. By, tilting rooms 26, the resultant force f stays perpendicular to the floor of the room. As a result, conditions simulating an effect of high gravity more than 1 g can be created inside of the rooms of the station. The angle γ can be determined by the law of sinus γ=aresin $(a_n/f)$. Example of calculation for a torus with radius of 80 m:

$$\gamma_{80}=\arcsin(a_{n80}/f_{80})=\arcsin(13.89/17.00)=0.956 \text{ radians, or about } 54.77°$$

Column 9

To transform the net acceleration from a unit of m/s² into a unit of g, it is necessary the value in column 7 to be divided by the value of 1 g=9.81.

The displacement b, formed by the Coriolis effect at each torus of the station, is defined in the table below:

| Radius of torus in meters 1 | Displacement, formed by Coriolis effect in meters 2 | Slope of the boards in grades ° 3 |
|---|---|---|
| 20 | 0.32 | 6.03 |
| 30 | 0.43 | 8.17 |
| 40 | 0.51 | 9.65 |
| 50 | 0.56 | 10.58 |
| 60 | 0.59 | 11.11 |
| 70 | 0.60 | 11.36 |
| 80 | 0.61 | 11.43 |
| 90 | 0.6 | 11.38 |
| 100 | 0.6 | 11.25 |

Calculations of displacement b and the slope of boards are identical with my calculations above in the Coriolis Effect on objects inside the station.

FIG. 12B shows the deviation of each of rooms 26 from vertical g at angle γ as a function of the radius at which they are located.

The result is that the larger the radius R of the torus, the greater the centripetal acceleration $a_n$, the net acceleration f, and the angle of deviation γ. Of course, there will be difference in the gravity acceleration of interior and exterior walls of the rooms, but the difference is small, around 2-3%. The difference decreases when the radius increases. That embodiment allows more efficient use of the space of the station for step by step adaptation of the staff, depending on the strength of the body to move to the next level of gravity acceleration.

Alternatively the station can include two or more floors. It depends solely on the capacity of the main entrance for the cargo and personnel.

In addition, the diameter of the torus and the velocity of rotation may vary depending on the desired size of living space and desired parameters of artificial gravity acceleration.

In using gravity acceleration station that is constructed, assembled and operated having more than one torus, individuals are provided with an opportunity of exploring different levels of gravity acceleration. The users enter the station through an entrance 12 adjacent to a central vertical axis 14 and arrive into a lift cabin 16. The lift cabin 16 proceeds to one of tori 30 having environment of desired gravity acceleration f. The lift cabin 16 moves by a trolley 44 within one of radially disposed lift corridors 18 extended between a vertical axis 14 and the torus 30. The angle of deviation of each of lift cabins 16 is in accordance with the distance between the central axis and each of the lift cabins 16 so that the net gravity acceleration f being perpendicular to the floor of each of the lift cabin 16 while having a constant speed of rotation of the gravity acceleration station.

The user proceeds to one of rooms 26 located in one of tori 30, having environment of desired gravity acceleration. The angle of deviation of each of rooms 26 is in accordance with the distance between the central vertical axis 14 and the respective torus 30 where the rooms are located, so as to be able to keep the desired magnitude of the gravity acceleration while rotating the gravity acceleration station at a constant speed. As a result individuals experience a net acceleration f as a summation vector of the force of gravity g and the centripetal force $a_n$ being perpendicular to the floor of each of the rooms 26 by turning each room at an angle of deviation from the vertical vector of the force of gravity g. The individuals use the rooms 26 for different purposes and not limited to living, working, training, researching, and for recreational activities for prolonged periods of time. They can stay in the gravity acceleration station, exploring different level of gravity acceleration. Individuals wishing to transfer from an environment of weaker gravity to an environment of stronger gravity or from an environment of stronger gravity to an environment of weaker gravity can achieve it by moving from one torus to another, each having different radius, while the angular velocity of rotation of the station has a constant value.

Although the description above contains many specificities, these should not be construed as limiting the scope of the embodiments but as merely providing illustrations of some several embodiments. Thus the scope of the embodiments should be determined by the appended claims and their legal equivalents, rather than by the examples given.

I claim:

1. A gravity acceleration station, comprising:
   a. a base of said station,
   b. a peripheral hollow torus rotating around a central vertical axis,
   c. a means for peripheral support of said torus located alternatively on said base of said station along with a torus perimeter, laterally on said torus, or simultaneously on said base and on said torus.
   d. said torus forming an enclosed compartment of annular configuration,
   e. a plurality of rooms located within said compartment of said torus, each room of sufficient interior size for living and working of occupants,
   f. a means for permitting access to, from and between said rooms,
   g. a fastening and rotating means for adjustment of room position by rotation of each of said rooms around an axis corresponding a torus circle.
   h. an entrance adjacent to said central axis,
   i. plurality of radially disposed lift corridors extended between said vertical axis and said torus,
   j. a cargo and personnel delivery lift cabin, movable on a trolley within said lift corridors,
   k. a means for regulation of an angle of deviation of said lift cabins and said rooms of said station in accordance with a distance respectively between said rooms and said central axis, and said lift cabins and said central axis,
   l. a means for driving a revolution of said torus around said vertical axis,
   m. a Coriolis effect compensation boards located on the floor of said rooms, whereby said station is able to produce gravity acceleration more than 1 g having a direction perpendicular to a floor of said rooms and a floor of said lift cabins by constant speed of rotation of said station for a prolonged periods of time.

2. The gravity acceleration station of claim 1, wherein said means for peripheral support of said station is a set of rails, wheels, or electromagnetic cushion.

3. The gravity acceleration station of claim 1 wherein said rooms are in sufficient size for use in different capacities of living rooms, research laboratories, warehouses, rooms for exercise and recreation, and premises that bring to comfortable life of people inside.

4. The gravity acceleration station of claim 1, wherein said means for permitting access to, from and between said rooms is a plurality of tambours, each tambour joined respectively at its ends to the neighboring rooms.

5. The gravity acceleration station of claim 1, wherein said means for driving a revolution of said torus around said vertical axis is a plurality of motors, alternatively mounted on the torus walls or located on said base along the torus perimeter.

6. The gravity acceleration station of claim 1, further including motor repairing premises, located respectively on said base.

7. The gravity acceleration station of claim 1, wherein said means for fastening and rotation of said rooms is a set of rotatable wheels.

8. The gravity acceleration station of claim 1, wherein said means for regulation of an angle of deviation of said rooms and said lift cabins is a computer.

9. The gravity acceleration station of claim 1, further including a plurality of tori, whereby said station can be of different size, providing a gradual distribution of gravity acceleration from the axis along with the radius of each torus of said station and having direction perpendicular to the floor respectively of said rooms and said lift cabins by constant speed of rotation of said station for a prolonged periods of time.

10. The gravity acceleration station in claim 9, further including a plurality of levels of tori, so as to be able to increase an operational area of said station.

11. The gravity acceleration station of claim 1, further including a vibration and friction reduction ballast hydraulic system.

12. The gravity acceleration station of claim 1, wherein said station is located preferably on the ground or underground.

13. A process method for creating an effect of gravity acceleration more than 1 g for prolonged periods of time in environments inhabitable by living occupants, said process method utilizing a gravity acceleration station, said gravity acceleration station incorporating a peripheral hollow torus rotating around a vertical axis, said torus comprising a plurality of rooms, attached to a torus inside wall by a set of rotatable wheels, each room of sufficient interior size for living and working of occupants, a base of said station, a peripheral support of said station comprising a set of rails, wheels, or electromagnetic cushion, a plurality of motors for driving a revolution of said torus around said vertical axis, said motors mounted alternatively on an outside wall of said torus or located on said base along the torus perimeter, and comprising:
  a. entering the station through an entrance adjacent to a central axis and arriving in a lift cabin,
  b. proceeding said lift cabin to one of said rooms by moving said lift cabin on a trolley within one of radially disposed lift corridors extended between said vertical axis and said torus,
  c. regulating an angle of deviation of each of said lift cabins in accordance with a distance between said central axis and each of said lift cabins so that said net acceleration being perpendicular to the floor of each of said lift cabins while rotating said gravity acceleration station at a constant speed,
  d. regulating an angle of deviation of each of said rooms in accordance with a distance between each of said rooms and said central axis, so as to be able to keep desired magnitude of gravity acceleration constant and being perpendicular to the floor of each of said rooms while rotating said gravity acceleration station at a constant speed,
  e. utilizing said rooms for purposes of living, working, training, researching and for recreational activities, bringing to a comfortable life of living occupants inside including researchers, astronauts, military and athletes,
  d. undergoing a net acceleration as a summation vector of a force of gravity and a centripetal force, turning each room at an angle of deviation from the vertical vector of the force of gravity so that said net acceleration being perpendicular to the floor of each of said rooms, whereby said process method for producing an effect of high gravity acceleration more than 1 g in environments inhabitable by living occupants can continue for prolonged periods of time without preventing the rotation of said station.

14. A process method for creating an effect of varied gravity acceleration for prolonged periods of time in environments inhabitable by living occupants wishing to transfer from an environment of weaker gravity to an environment of stronger gravity or from an environment of stronger gravity to an environment of weaker gravity, said process method utilizing a gravity acceleration station incorporating a base of said station and a plurality of hollow tori, rotating around a central vertical axis, each torus forming an enclosed compartment of annular configuration, a plurality of rooms located within said compartment of each torus, each room of sufficient interior size for living and working of occupants, a plurality of tambours for permitting access to, from and between said rooms, each tambour joined respectively at its ends to the neighboring rooms, a set of rotatable wheels for adjustment of the room position by rotation of each of said rooms around an axis corresponding to each torus circle, an entrance adjacent to said central axis, a plurality of radially disposed lift corridors extended between said vertical axis and each of said tori, a plurality of cargo and personnel delivery lift cabins, each lift cabin movable on a trolley within each of said lift corridors, a computer for regulation an angle of deviation of each of said lift cabins and each of said rooms in accordance with a distance between each of said rooms and said central axis from one side, and each of said lift cabins and said central axis from another side, a plurality of motors, alternatively mounted on the torus walls or located on said base along the torus perimeter for driving a revolution of said plurality of tori around said vertical axis, a peripheral support comprising a set of rails, wheels, or electromagnetic cushion, said support located on said base of said station along with each torus perimeter, a plurality of Coriolis effect compensation boards located on the floor of said rooms, and motor repairing premises, located respectively on said base, and comprising:
  a. entering the station through an entrance adjacent to a central axis and arriving in a lift cabin,
  b. proceeding said lift cabin to one of said torus, having gravity environment of a desired magnitude of gravity acceleration by moving said lift cabin on a trolley within one of radially disposed lift corridors extended between said vertical axis and each of said tori,
  c. regulating an angle of deviation of each of said lift cabins in accordance with the distance between said central axis and each of said lift cabins so that said net gravity acceleration being perpendicular to the floor of each of said lift cabins while rotating said gravity acceleration station at a constant speed,
  d. regulating an angle of deviation of each of said rooms of each of said tori in accordance with the distance between each of said tori and said central axis, so as to be able to keep desired magnitude of gravity acceleration constant and being perpendicular to the floor of each of said rooms while rotating said gravity acceleration station at a constant speed,
  e. utilizing said rooms for purposes of living, working, training, researching and for recreational activities, bringing to a comfortable life of living occupants inside including researchers, astronauts, military and athletes,
  f. undergoing a net acceleration as a summation vector of a force of gravity and a centripetal force, turning each room at an angle of deviation from the vertical vector of the force of gravity so that said net acceleration being perpendicular to the floor of each room, whereby said process method for simulating an effect of varied gravity acceleration for prolonged periods of time in environments inhabitable by living occupants can provide an opportunity of exploring different level of gravity acceleration, by moving from one of said torus to another having different radii, while the angular velocity of rotation of said station has a constant value.

* * * * *

UNITED STATES PATENT AND TRADEMARK OFFICE
CERTIFICATE OF CORRECTION

PATENT NO. : 8,931,741 B1
APPLICATION NO. : 13/894386
DATED : January 13, 2015
INVENTOR(S) : Pavel Kilchichakov It is certified that error appears in the above-identified patent and that said Letters Patent is hereby corrected as shown below:

On the Title Page, Item (54) and in the Specification, Column 1, Line 1 the title of invention "Gravity Acceleration Station" should be changed to --Gravity Acceleration Station and Method of Use--.

Signed and Sealed this
Twenty-eighth Day of April, 2015

Michelle K. Lee
*Director of the United States Patent and Trademark Office*